June 1, 1926.
C. R. WEISS
1,587,054
CHAIN LINK
Filed June 17, 1925
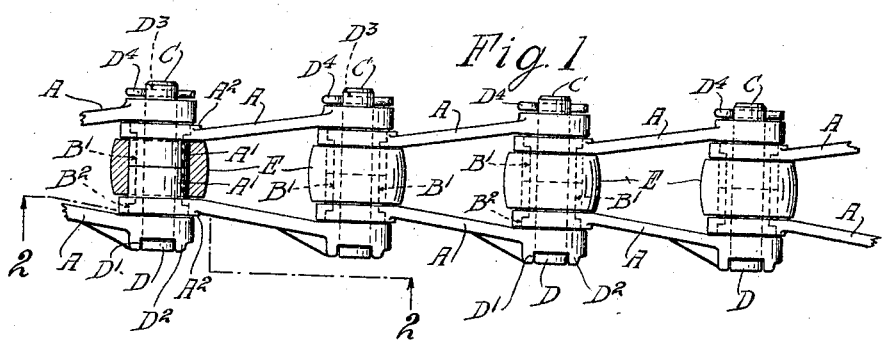
Fig.1
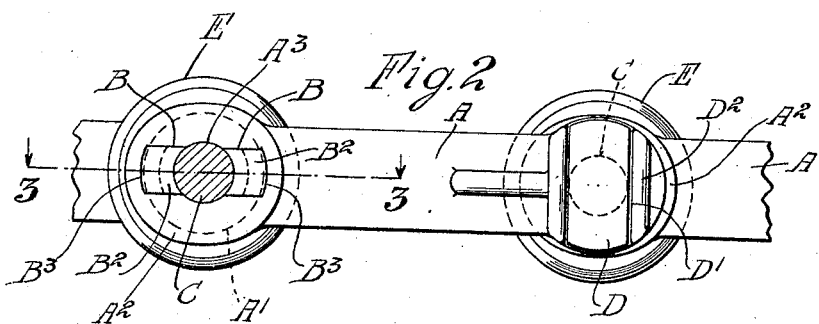
Fig.2
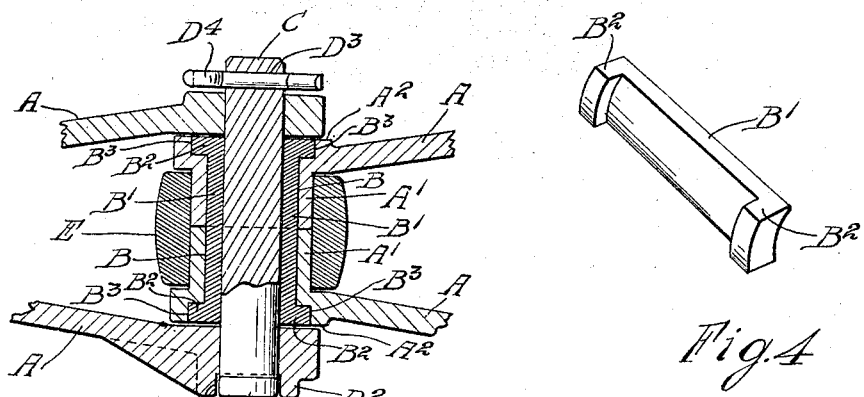
Fig.3
Fig.4
Inventor.
Charles R. Weiss
by Parker & Carter
Attorneys.

Patented June 1, 1926.

1,587,054

UNITED STATES PATENT OFFICE.

CHARLES R. WEISS, OF INDIANAPOLIS, INDIANA, ASSIGNOR TO LINK-BELT COMPANY, OF CHICAGO, ILLINOIS, A CORPORATION OF ILLINOIS.

CHAIN LINK.

Application filed June 17, 1925. Serial No. 37,630.

My invention relates to an improvement in chains or their links and particularly to an improvement in assembled, malleable links. It has for one object to provide a chain which shall be quick and simple to assemble and cheap to make. Another object is the provision of a chain in which the bearing parts are interchangeable and removable. Other objects will appear from time to time in the course of the specification and claims.

I illustrate my invention in the following drawings wherein:

Figure 1 is a plan view of my invention.

Figure 2 is a section taken on line 2—2 of Figure 1.

Figure 3 is a longitudinal section taken on line 3—3 of Figure 2, and

Figure 4 is a perspective view of a bushing member.

Like parts are indicated by like symbols throughout the specification and drawings.

My chain consists of a succession of uniform and assembled links. Each link consists of a pair of side bars A A which are each provided at one end with inwardly projecting tubular or cylindrical portions $A^1$. The opposite sides are flattened, as at $A^2$, the ends being perforated as at $A^3$. In assembling the links the opposed cylindrical portions $A^1$ abut. Their central apertures are provided with grooves B, their interior apertures $A^3$ being otherwise cylindrical. Adapted to seat in these grooves B are the bushing portions or sections $B^1$. It will be noted that the grooves are diametrically opposed and are positioned along the plane of strain of the chain. The bushing members $B^1$ are provided at each end with outwardly projecting shoulders $B^2$ adapted to fit into the opposed apertures $B^3$, the outer faces of the shoulders being shown as flush with the surfaces $A^2$. The links are held in position, when assembled, by the pins C, one end of the pin terminating in a T or shoulder D adapted to sit in the slot $D^1$ of the boss $D^2$ on one of the side bars A. The opposed end is perforated as at $D^3$ to receive a cotter $D^4$ or any suitable securing means. When the chain is assembled a roller E surrounds the cylindrical portions $A^1$ and rotates thereabout.

In assembling and taking down the chain, upon removal of the pin C the bushings $B^1$ may be pried out into the central cylindrical opening and are easily removable. When the pin is in place, however, they are firmly held in position, since the pin prevents lateral movement toward the center of the aperture $A^3$, the walls of the recesses B prevent other lateral movement, and the shoulders $B^2$ prevent longitudinal movement. The bushing sections are so disposed as to take the maximum wear, and, being easily removable, may be easily replaced or interchanged.

It will be realized that, while I have illustrated a practical invention, nevertheless I do not wish to limit myself to the specific description and showing herein. Many changes may be made in size, shape, number and disposition of parts without departing from the spirit of my invention, and I wish my drawings and description to be taken as in a broad sense illustrative.

I claim:

1. In an assembled chain, chain links each comprising a pair of side bars, the side bars of each pair having at one end inwardly projecting cylindrical lugs, the inside walls of said cylinders being recessed, bushing sections positioned in said recesses and extending from side to side of the link and terminating in outwardly projecting shoulder portions, the side bars being recessed to receive said shoulders, a pin passing through the central aperture of said cylindrical lugs, and means for preventing axial withdrawal of the pin.

2. In an assembled chain, chain links each comprising a pair of side bars, the side bars of each pair having at one end inwardly projecting cylindrical lugs, the inside walls of said cylinders being recessed, bushing sections positioned in said recesses and extending from side to side of the link and terminating in outwardly projecting shoulder portions, the side bars being recessed to receive said shoulders, a pin passing through the central aperture of said cylindrical lugs, and means for preventing axial withdrawal of the pin, and a roller rotatable about said cylindrical lugs.

3. In an assembled chain, chain links comprising side bars, abutting lugs inwardly projecting from the ends of said side bars, the inner walls of said lugs being recessed, removable bushings positioned in said recesses and a securing pin adapted to connect adjacent links and to hold said bushings from movement, the bushings being provided with outwardly projecting members adapted to seat in the inner walls of said lugs, the respective sizes of the parts being such that when the pin is in position the projecting members are seated in the inner walls of said lugs and are adapted to hold the bushings against movement in relation to said lugs.

4. An assembled chain comprising a plurality of links, each link comprising a pair of side bars, cylindrical lugs inwardly projecting from one end of each of said side bars, the opposite ends of the side bars of the adjacent link being positioned outwardly of said first mentioned ends, and removable bushings mounted in said cylindrical lugs, the bushings being provided with outwardly projecting portions adapted to seat in the cylindrical lugs, the cylindrical lugs being formed to receive such portions, and a securing pin adapted to pass through said lugs and said bushings and to hold said bushings with said projecting portions in engagement with their opposed seats in the walls of said lugs.

5. An assembled chain comprising a plurality of links, each link comprising a pair of side bars, cylindrical lugs inwardly projecting from one end of each of said side bars, the opposite ends of the side bars of the adjacent link being positioned outwardly of said first mentioned ends, removable bushings mounted in said cylindrical lugs, shoulders at the ends thereof adapted to seat in recesses in the link members and a transverse securing pin adapted to secure said links together and to hold said bushings against movement.

6. An assembled chain comprising a plurality of links, each link comprising a pair of side bars, lugs inwardly projecting from one end of each of said side bars, the opposite ends of the side bars of the adjacent link being positioned outwardly of said first mentioned ends, removable bushings mounted in said lugs, shoulders at the ends thereof adapted to seat in recesses in the link members and a transverse securing pin adapted to secure said links together and to hold said bushings against movement.

Signed at Indianapolis county of Marion and State of Indiana, this 8th day of June, 1925.

CHARLES R. WEISS.